E. CRAIG.
BOX BLANK MACHINE.
APPLICATION FILED FEB. 23, 1906. RENEWED DEC. 7, 1914.
1,132,515.
Patented Mar. 16, 1915.
8 SHEETS—SHEET 4.
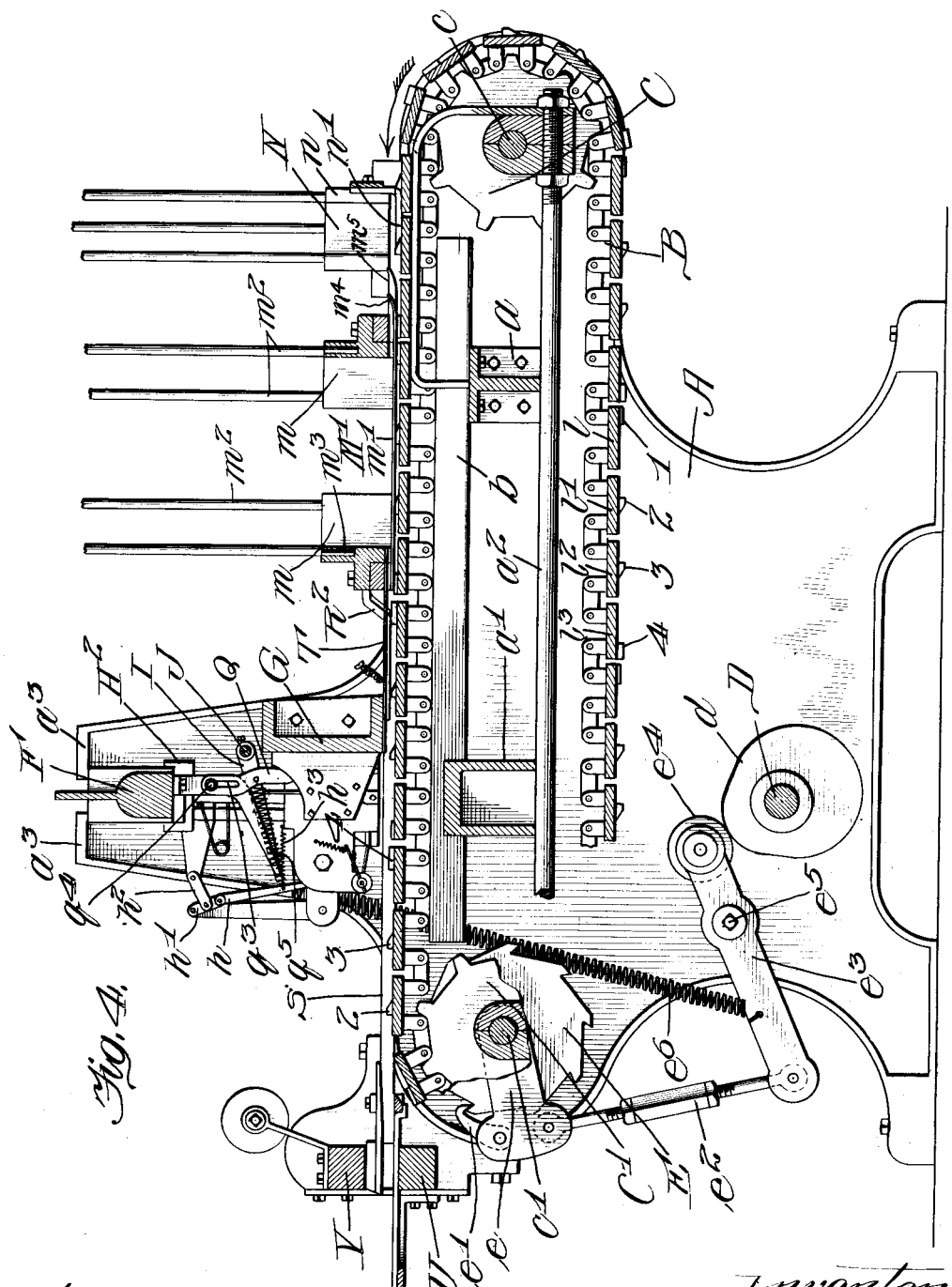
Witnesses:
Robert H. Weir
A. C. Bird.
Inventor:
Edward Craig
By Buckley & Durand
Attys.

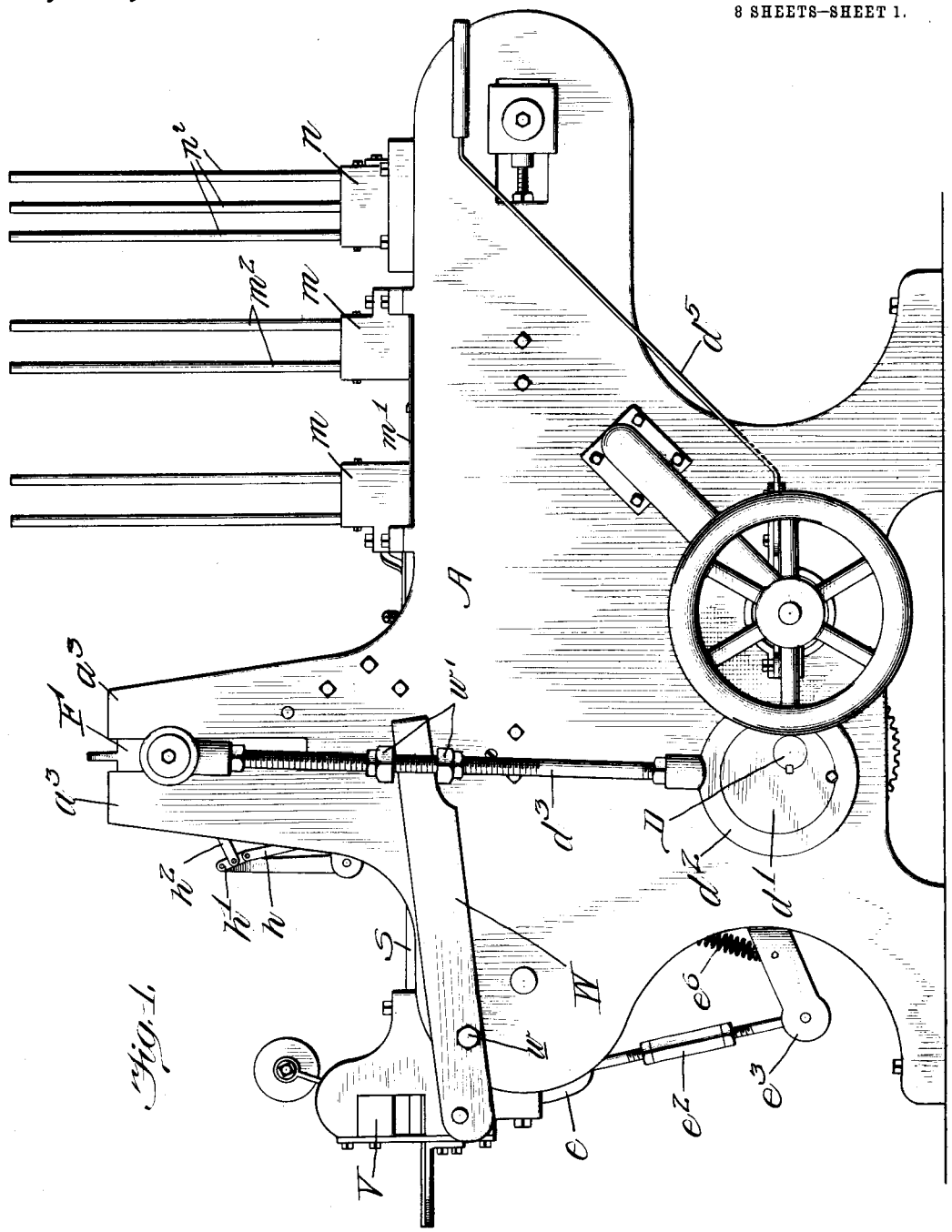

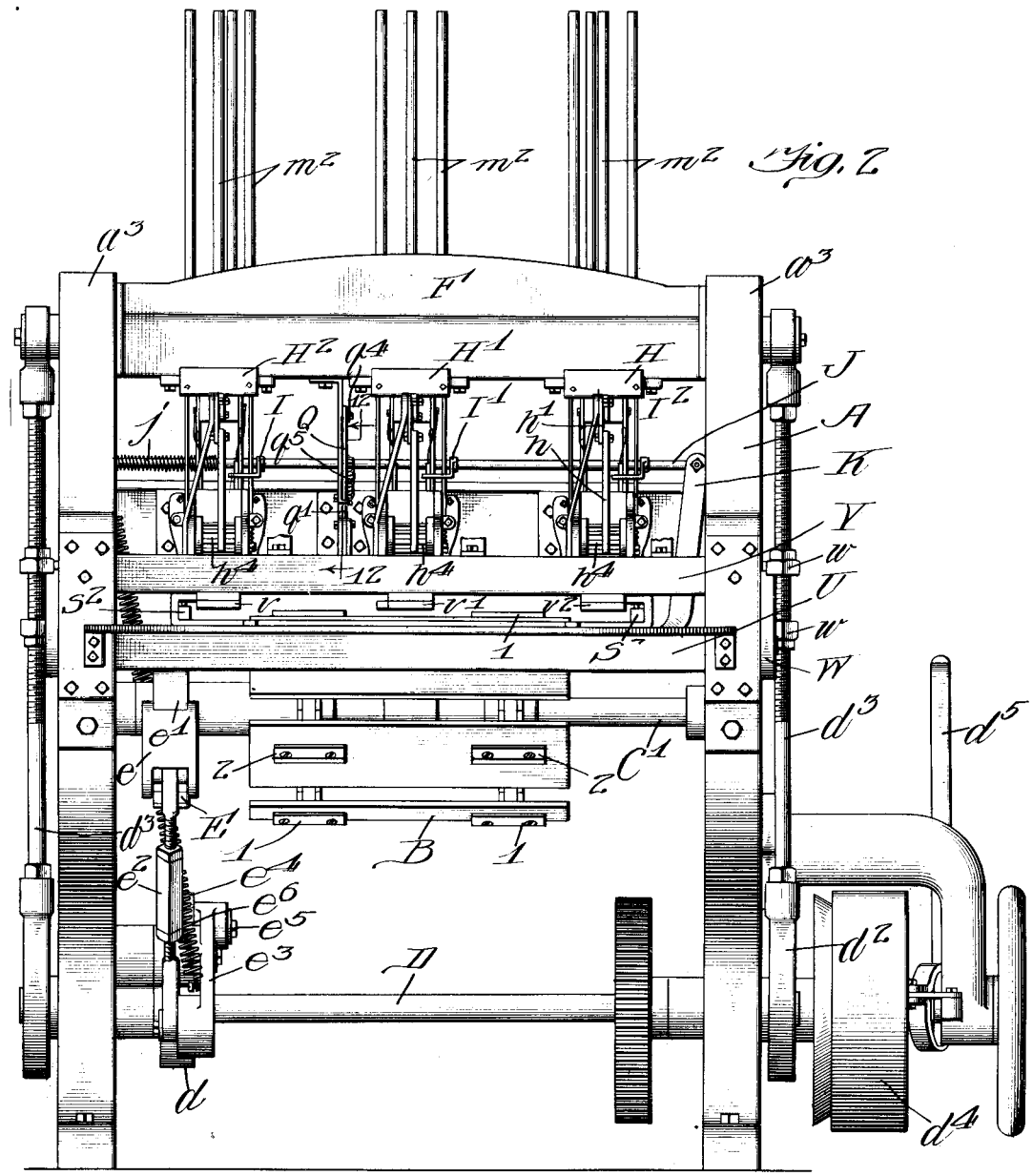

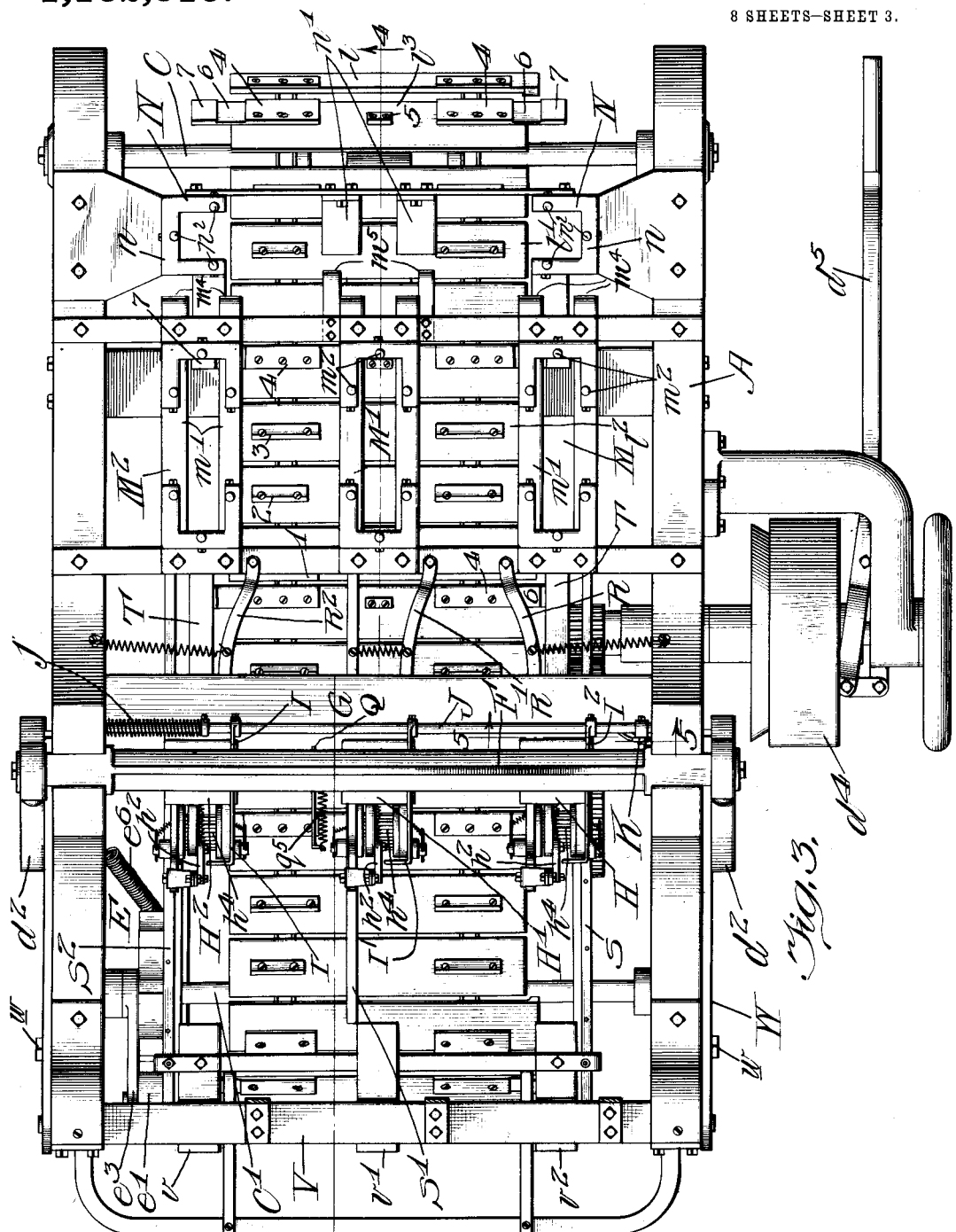

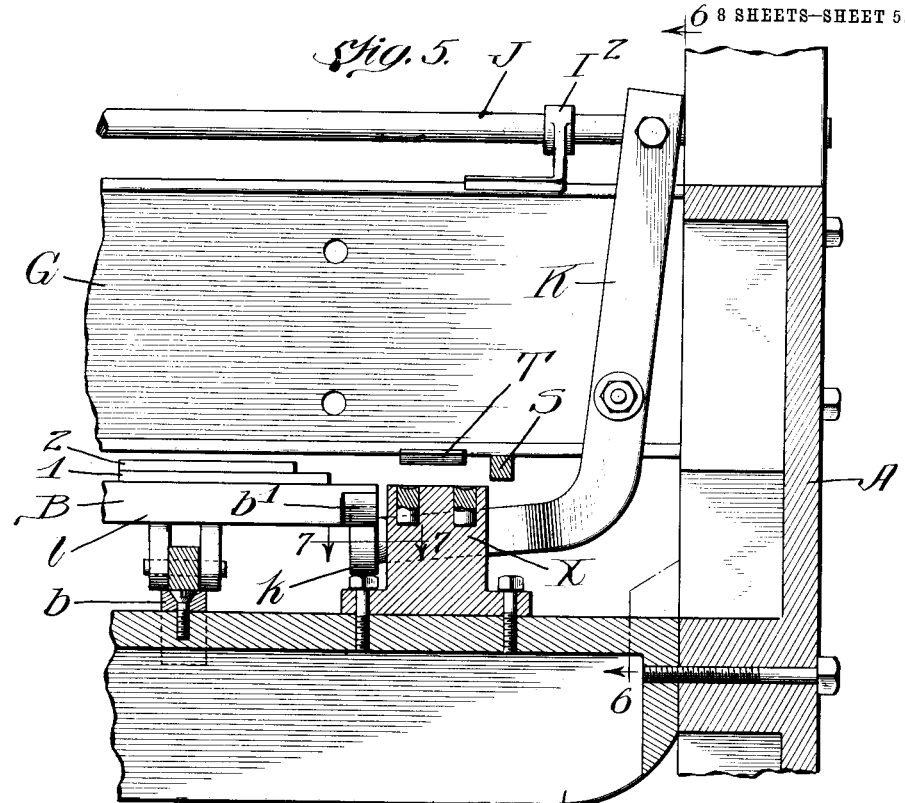

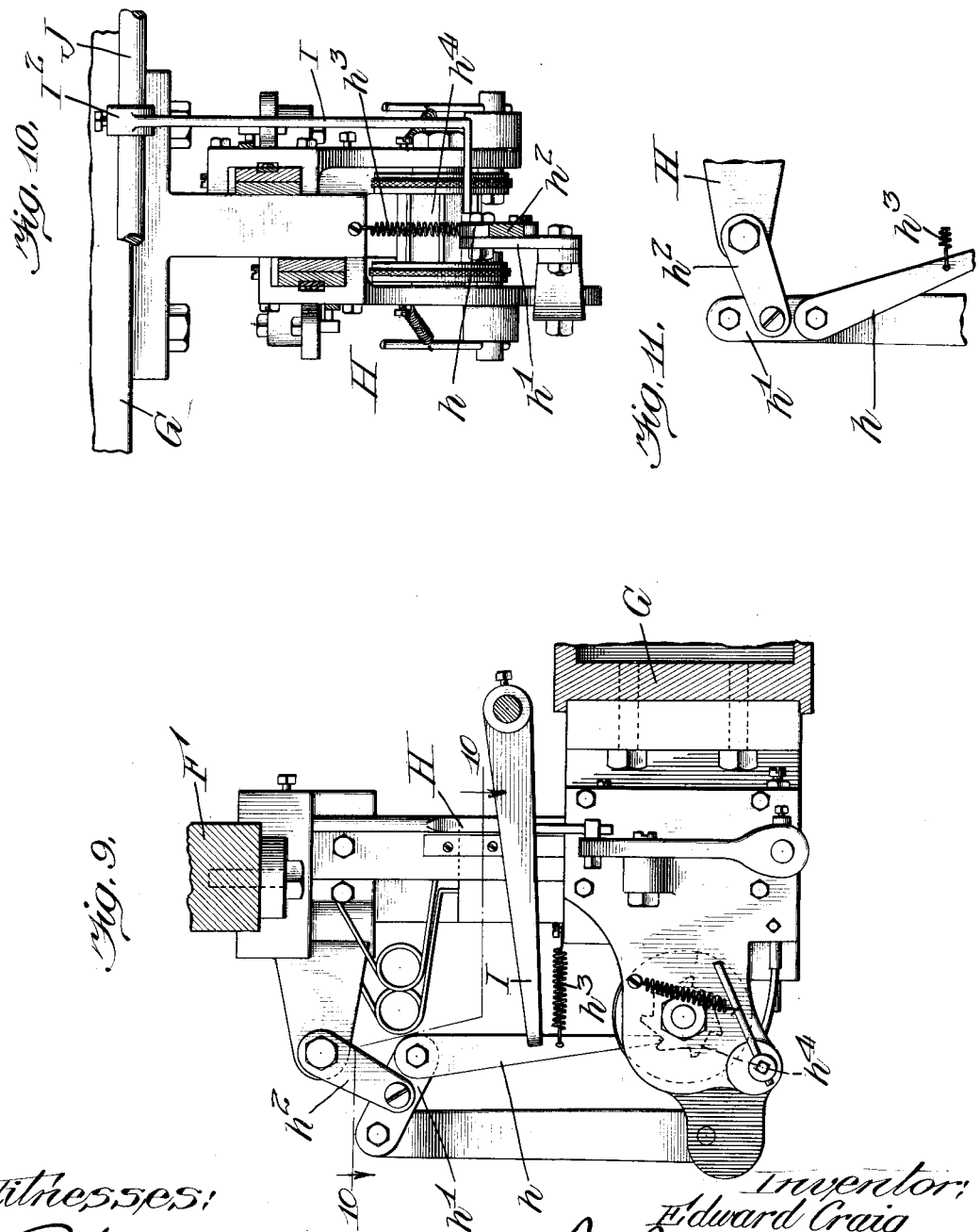

E. CRAIG.
BOX BLANK MACHINE.
APPLICATION FILED FEB. 23, 1906. RENEWED DEC. 7, 1914.
1,132,515.
Patented Mar. 6, 1915.
8 SHEETS—SHEET 7.
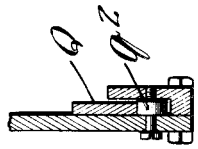
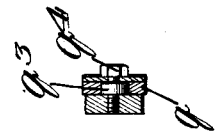
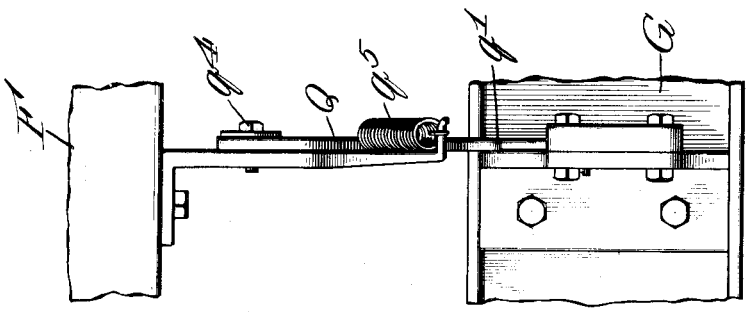
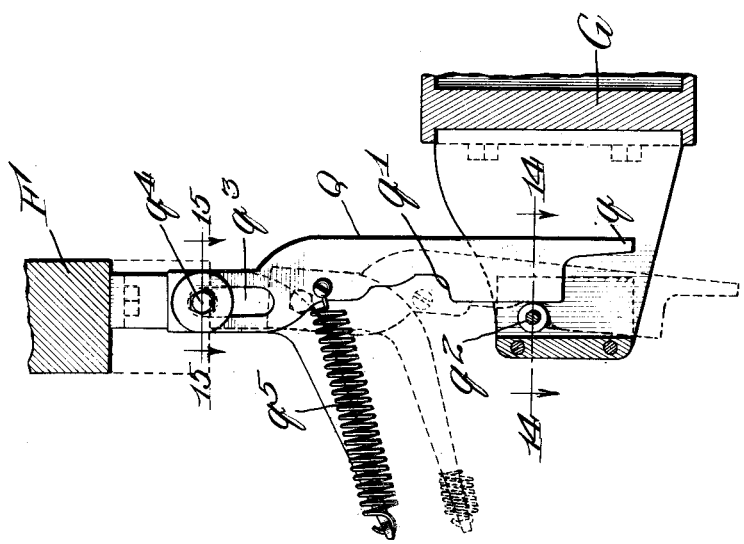
Witnesses:
Robert H. Weir
A. C. Bird
Inventor:
Edward Craig
By Buckley & Durand
Attys.

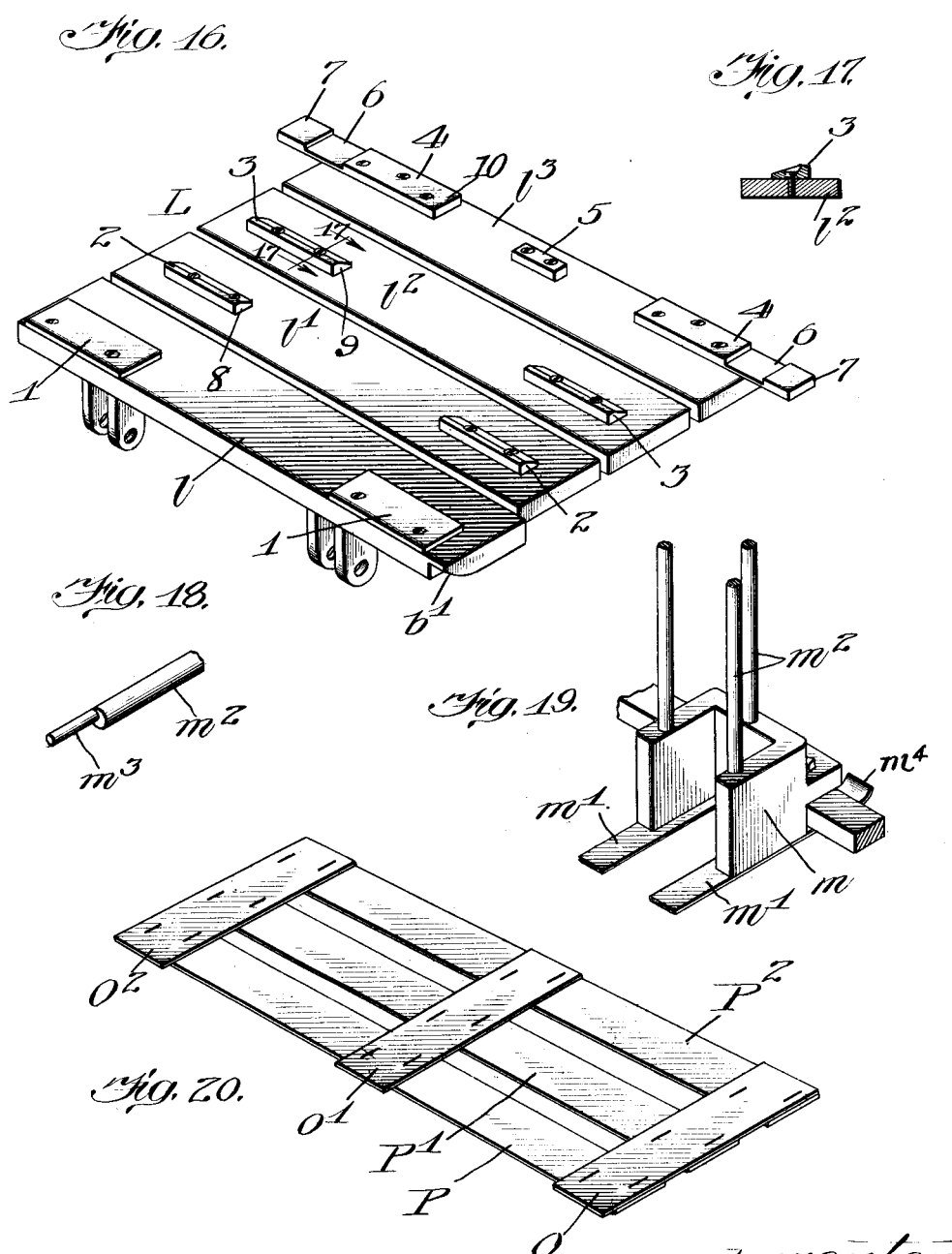

UNITED STATES PATENT OFFICE.

EDWARD CRAIG, OF ST. JOSEPH, MICHIGAN, ASSIGNOR, BY MESNE ASSIGNMENTS, TO SARANAC MACHINE CO., OF ST. JOSEPH, MICHIGAN, A CORPORATION OF MICHIGAN.

BOX-BLANK MACHINE.

1,132,515.           Specification of Letters Patent.      Patented Mar. 16, 1915.

Application filed February 23, 1906, Serial No. 302,631. Renewed December 7, 1914. Serial No. 875,975.

*To all whom it may concern:*

Be it known that I, EDWARD CRAIG, a citizen of the United States of America, and resident of St. Joseph, Berrien County, Michigan, have invented a certain new and useful Improvement in Box-Blank Machines, of which the following is a specification.

My invention, as herein described and illustrated relates to machinery for making crate-sides of that particular character in which a plurality of long slats are properly spaced and held together by transverse end and intermediate slats. It will be seen, however, that many of the features and combinations of my invention are applicable to machinery for making various kinds of box and basket blanks, such, for example, as the wire-bound box blanks having end cleats for reinforcing the same, as well as many other blanks or articles of this kind.

Generally stated, therefore, the object of my invention is to provide an improved and highly efficient machine for making crate-sides or box blanks or other similar articles.

A special object of my invention is to provide a novel and efficient form of traveling work-holder for feeding the materials forward in properly crossed and spaced relation.

Another object is to provide novel and effective means for automatically feeding the materials to said work holder.

A further object is to provide improved mechanism for preventing the driving of staples between the blanks.

As a matter of further and special improvement, it is also an object to provide novel and effective means for automatically positioning the materials, relative to each other, immediately before being fastened together; and in the arrangement shown and described, embodying the features of my invention, the materials are fed forward to the staplers, but are operated upon by said means, immediately before passing under the staplers, for the purpose of properly spacing or separating certain portions of the materials before they are fastened together; and thus the proper positioning of the materials, or some of them, while traveling forward is of no importance, as they are subject to a positioning operation immediately or some time before receiving staples.

Another object is to provide a novel and more efficient feed mechanism for feeding the staple wire to the staplers.

A further object is to provide efficient means for compressing the blanks after they have been stapled together, and after they have passed out from under the staplers, for the purpose of insuring flush or smooth surfaces for the blanks, as far as the staples are concerned, thereby preventing the staples from projecting from the surface of the blank, in case the same are not fully clenched when driven, and also insuring a tighter and more effective fastening together of the materials from which the blanks are made.

It is also an object to provide certain details and features of construction and combinations tending to increase the general efficiency and serviceability of a crate or box blank machine of this particular character.

To the foregoing and other useful ends my invention consists in matters hereinafter set forth and claimed.

In the accompanying drawings—Figure 1 is a side elevation of a crate-side machine embodying the principles of my invention. Fig. 2 is an end elevation of the same. Fig. 3 is a plan of the same. Fig. 4 is a longitudinal section on line 4—4 in Fig. 3. Fig. 5 is a detail section on line 5—5 in Fig. 3, on an enlarged scale. Fig. 6 is a vertical section on line 6—6 in Fig. 5. Fig. 7 is a detail sectional view on line 7—7 in Fig. 5. Fig. 8 is a detail section on line 8—8 in Fig. 6. Fig. 9, is an enlarged detail view of one of the three pairs of staplers. Fig. 10 is a section on line 10—10 in Fig. 9. Fig. 11, is a detail view. Fig. 12 is a detail sectional view on line 12—12 in Fig. 2, on a larger scale. Fig. 13, is a side elevation of the mechanism shown in Fig. 12. Fig. 14 is a detail section on line 14—14 in Fig. 12. Fig. 15 is a detail section on line 15—15 in Fig. 12. Fig. 16 is a perspective of one of the sets or formers comprised in the construction of the endless traveling work holder. Fig. 17 is a detail section on line 17—17 in Fig. 16. Fig. 18 is a perspective of the lower end of one of the hopper rods. Fig. 19 is a perspective of the forward end of one of the hoppers for the cross slats. Fig. 20 is a perspective of a finished crate-side.

As thus illustrated, my invention comprises a body frame A and an endless traveling work holder B. Said frame has its side portions connected by cross pieces $a$ and $a'$ and strengthened by longitudinal rods $a^2$. Said work holder is mounted on the sprocket wheels C and C', which latter are carried by the transverse end shafts $c$ and $c'$. As shown, the work holder comprises two link belts having their links connected and adapted to engage the said sprocket wheels, thus providing a moving bed or table for the work. A drive shaft D is supported in bearings on the frame and provided with a cam $d$. This cam operates the ratchet wheel E for intermittently advancing the work holder B, as indicated by the arrow in Fig. 4. Said ratchet wheel is secured to the shaft $c'$. A link or arm $e$ is hung on said shaft and provided with a ratchet dog $e'$ which engages the ratchet wheel. The link or rod $e^2$ connects the arm $e$ with the lever $e^3$. This lever is provided with a roll $e^4$ and pivoted at $e^5$. A spring $e^6$ holds the ratchet dog in normal position, and effects the back stroke of the same. The feed mechanism is so timed and operated that the work holder B is worked along in a step by step manner, and the work properly presented to the staplers. The work is of course always stationary when the staples are actually being inserted. The two link belts or sprocket chains of the work holder run on guides or supports $b$ (one at each side of the machine), and thus the upper portion of the work is held firmly below the hoppers and staplers. A clutch $d^4$ controlled by a hand lever $d^5$ is used for starting and stopping the machine. The vertically reciprocating crosshead F is mounted in vertical guides $a^3$. Cams $d'$ on the shaft D are connected with said cross head by means of straps $d^2$ and pitmen $d^3$, the latter being threaded. Said cross heads operate the three pairs of staplers H—H'—H² which can be of any suitable construction. The wire feed mechanism of these staplers is, however, of an improved form. Some parts of the staplers are mounted upon the usual stationary transverse head or beam G; but the feed pawl $h$, for example, is mounted on a link $h'$ carried by the beam G. A link $h^2$ connects the middle of the link $h'$ with the cross head. The spring $h^3$ keeps the pawl pressed normally against the ratchet wheel $h^4$ of the usual feed rolls. When the cross head moves down the connections cause the pawl $h$ to partially rotate the wire feed rolls and thereby feed the wire to the stapler H. Every fourth stroke, however, the finger I advances and holds the pawl out of operative engagement with the ratchet wheel; and in this way the three successive strokes of the cross-head serve to drive the three sets of staples, but the fourth stroke does not drive any staples, as the feed pawls are all rendered temporarily inoperative every fourth stroke. In this way no staples are driven between the crate-sides, the staplers skipping, so to speak, the spaces between the crate sides on the work holder. These fingers I—I'—I² are all mounted on a transverse and endwise movable rod J which is kept in normal position by a spring $j$. It will be seen that a pivoted lever K engages the said rod J and has its lower end provided with a roll $k$ adapted to engage the cams $b'$ carried by the work holder B. Each time a cam engages the lever the rod J shifts and the feed mechanisms of all the staplers are momentarily rendered inoperative, and no staples are driven. After this the staplers drive three sets of staples in succession and thereby fasten together the six slats of the crate-side. Then the staplers skip driving again, as the work holder is moved along one step, and then the next three sets are driven for the next crate-side. This is repeated and the automatic making of the crate-sides continues as long as the machine runs, or as long as the stock of slats in the hoppers lasts.

In Fig. 16 a complete former L is shown, it being understood that the work holder as a whole is made up of a series of these formers. Each former consists of four transverse and link connected sections $l$—$l'$—$l^2$—$l^3$, the first having the cam $b'$ at one end thereof. The section $l$ is provided with cleats 1; the section $l'$ with cleats 2; the section $l^2$ with cleats 3; and the last section with cleats 4—4 and 5. The cleats 4—4 each has a transverse recess 6 on the upper surface thereof.

As shown, there are three longitudinal hoppers M—M'—M² for the three transverse slats of the crate-side, and one transverse hopper N for the longitudinal slats of the crate-sides, (see Fig. 3.) The hopper M', for example, comprises end members $m$ having lower longitudinal ledges $m'$ upon which the slats can rest, so that the lowest or bottom slat is always unobstructed at each end. Immediately upon leaving the hopper N the slats P, P' and P² are carried under and held down by the ledges or long flat strips $m'$. Vertical rods $m^2$ have eccentric lower end portions $m^x$ which are mounted in the members $m$. These rods can be rotated to bring their sides flush with the inner surfaces of the end members $m$. The hopper N consists of end members $n$ and a couple of intermediate supports $n'$—$n'$. This hopper has vertical rods $n^2$ like the rods of the other hoppers. The lowest or bottom slat in this hopper N always has its front and rear edges unobstructed. The slats are arranged one on top of the other in all four hoppers. The portions 7—5—7 engage the ends of the three bottom slats in the three hoppers M—M'—M² and push them out upon the work holder as the latter moves along. Before this, however, the cleats 2 have engaged and removed the lowest slat in the hopper N; the cleats 3 have then followed and removed the next slat from the same hopper; and then the cleats 4 remove the next and third long slat of the crate-side. When this is done the three cross slats O—O'—O² of the crate-side are simultaneously discharged onto the ends and middle of the three long slats P—P'—P². It will be understood, of course, that the cleats or projections 2, 3, 4, 5 and 7 can all be of substantially the same height, and that the different hoppers can all be located at the same height or distance above the surface of the work-holder or traveling table. For example, these cleats or projections can be equal in height to twice the thickness of the slats or staves, and the bottom slats or staves in the different hoppers can all be substantially one thickness above the traveling work-holder or table. With this arrangement, the long slat or stave P is brought onto the traveling work-holder by the cleats 2; the next slat or stave P' is engaged and brought onto the traveling work-holder by the cleats 3; and the last slat or stave P² is then engaged by the cleats or fingers 4, 5 and 7, and thereby discharged from the hopper and brought into place on the traveling work-holder. This, of course, leaves the cleats 5 and 7 extending slightly above the surface of the slat or stave P². Consequently the ends of the lower slats or staves in the three parallel hoppers are then engaged by these cleats 5 and 7, with the result that the said cross slats or relatively short staves O, O' and O² are discharged crosswise on the three long slats. The cleats 2, 3 and 4 do not engage any of the cross slats, as these cleats travel along between the three parallel hoppers. In this way each former L automatically supplies itself with a full set of slats, and the different sets are carried along, step by step, and each subjected to the action of the staplers. It will be seen that each cross slat receives six staples. In this way the flat rectangular crate-side shown in Fig. 20 is made with rapidity and accuracy. The kickers Q shown in Fig. 12, are operated by the cross-head F, and serve automatically to insure a proper position for each long slat P before it receives the staples. In this way slight disarrangement of the long slats P before the same reach the staplers is rectified by the kickers before the staples are driven. Each kicker has a finger $q$ adapted to engage the rear edges of the long slats; a cam $q'$ adapted, when the cross-head moves down, to engage the roll $q^2$ on the beam G; a slot $q^3$ through which extends the supporting bolt $q^4$, and whereby the kicker stops moving before the cross-head reaches the limit of its downward stroke; and a spring $q^5$ for keeping the kicker pressed against the roll $q^2$. When the cams $q'$ reach the rolls $q^2$ the three kickers snap forward and move the slat P into correct position, thus serving in effect to slightly accelerate the forward movement of some parts of the work immediately before the same is fastened together. The cross slats are guided by spring pressed fingers R—R'—R², as shown in Fig. 3. Also, as will be seen, the three cross-slats are held firmly against the three longitudinal and parallel guides S—S'—S². While going under the stapler the slats are held down by guards T. Before each finished crate-side is discharged from the machine it is subjected to the upward pressure or impact of the transverse jaw U which coöperates with the upper stationary jaw V in fully clenching and flattening all of the staples. This jaw is operated by the levers W which are pivoted, one at each side, at $w$ and engaged by the nuts $w'$—$w'$ on the pitman $d^3$. The upper jaw V, has the three anvils $v$—$v'$—$v^2$, as shown in Fig. 2, which are in line with the three cross slats of the crate-side. Below each outer stapler there is a clench block or anvil X. The staples of the middle stapler may clench on the work-holder.

The feed pawls for the staplers are, with the improved arrangement, adapted to move downward for the desired or requisite distance, and to then stop, thus allowing the cross-head to move to the end of its downward stroke without moving the pawls farther, owing to the novel link arrangement.

The friction of the parts, as shown, can be employed to stop the work-holder at the end of each step or stroke. I do not, however, limit myself to any particular means for preventing the work-holder from moving more than a prescribed distance each stroke or step.

The details can, of course, be varied or changed without departing from the spirit of my invention.

It will be seen that my improved machine is in the nature of an assembler for automatically assembling the members of the sides or top of a packing. The long slats or staves P, P' and P² may be termed "body members," while the cross slats or staves O, O', and O² may be termed "battens". The hoppers are in the nature of reservoirs or holders for maintaining the said body members or battens in superimposed condition, adapting the same to be discharged one at a time from the bottom thereof.

It will be seen that the work-holder may comprise any suitable number of chains, and that the means for removing the slats from the hoppers can be distributed or located on said chains in any suitable manner. As shown, the machine has a receiving end portion where the long slats are placed crosswise of the work-holder, and the hoppers for automatically delivering the short or cross slats or battens are disposed intermediate the staplers and the said receiving end of the machine. The long hopper at the end of the machine can be used or not, according to requirements, and according to the character of the stock. If the said hopper is not used, then the long slats or body members can be placed by hand on the work-holder, and the short slats or battens will then be automatically delivered on top of the same.

The hoppers for the battens or cross slats are provided with cams $m^4$ which bear upon the body members or long slats to hold the latter down, after the same have been delivered to the traveling work-holder. There are some additional cams or guards $m^5$, which are secured to the frame work at each side of the middle hopper M', and which reach ahead of the other cams so as to press down the middle portions of the said long slats or body members. It will be seen, therefore, that these cams or guards are all interposed between the long hopper and the set of short hoppers, and in this way the said body members or long slats are always pressed down and held flat upon the work-holder just before they pass under the three short hoppers. It will be seen that the portions 5 and 7 first engage a body member or long slat and remove the same from the long hopper; and then after the said cams or guards have pressed the said body member or long slat downwardly upon the work-holder, these portions 5 and 7 then project upwardly above the upper surface of said body member or slat, thus enabling the said feed blocks 5 and 7 to simultaneously engage three of the battens or cross slats. Thus these feed blocks 5 and 7 are adapted to first engage the long slat or body member, and being of a height substantially equal to the combined thickness of a body member and a cross slat, each block is adapted thereafter to engage the end of a batten or cross slat and remove the same from the bottom of one of the hoppers.

As previously stated the kickers or spacing fingers Q operate to automatically position the long slats or strips of veneer from which the blanks are made, whereby these strips are properly spaced apart before being fastened together. Obviously, however, and by reason of the slot $q^3$ which enables the stapler heads to continue moving downward after the kickers or fingers Q have engaged the traveling work-holder, it is possible to skip the slats P' and P², whereby these two slats will not be subjected to the action of said kickers or fingers. With the arrangement shown, only one of these kickers or fingers Q is employed, (see Fig. 2) this one being disposed immediately at the left of the stapler head H', whereby the end portion $q$ just misses the end 8 of the cleat 2, but comes down upon the end portion 9 of the cleat 3, as well as upon the end portion 10 of the cleat 4 during the operation of the machine. In this way the end portion $q$ of the kicker or finger will move downward and engage the flat top of the traveling work holder at a point somewhere in rear of the slat P, but will not do this with the slats P' and P², for the reason just stated. In this way, it will be seen that variations in the width of the long slats, which is quite liable to happen in practice, will not cause any variation in the width of the blank—that is to say, the outer edges of the slats P and P² will always be the same distance apart, regardless of variations in the width of the stock from which these slats are made.

When the end portion $q$ strikes the top of the end portion 9 of the cleat 3 the shoulder or cam portion $q'$ does not pass under the roller $q^2$, and hence the kicker does not swing forward at such time under the tension of the spring $q^5$; or if it does swing forward, nothing is accomplished, inasmuch as in such case the end of the portion $q$ would simply swing over the slat $p'$, instead of pushing the latter forward. The same is practically true when the end portion $q$ of the kicker or spacing finger comes down on top of the end portion 10 of the cleat 4, as in such case the slat P² is not kicked or shoved forward. In one sense, therefore, the kicker Q, or kickers, if more than one are used, serves or serve to accelerate the forward feeding movement of certain portions of the materials immediately before passing under the staplers. In other words, these materials encounter something in their path of travel which causes them to move forward faster then they are carried by the endless traveling work-holder. Also, it will be seen that the portion $q$ enters the path of the materials and travels a distance therewith, being automatically inserted into and withdrawn from the horizontal plane in which the materials travel forward, whereby the blanks, or the materials of each blank, are successively operated upon by one and the same spacing or positioning device. It is obvious, of course, that several of these kickers Q can be employed if desired. For example, another one can be disposed between the stapler heads H and H', (see Fig. 2) exactly as the one shown is disposed between the middle stapler and the one to the left; and in such case it is obvious that another set of long and short cleats or spacing members would be used, similar to the cleats 2, 3, and 4 at the other side of the work-holder, if it is desired to have all of the kickers or positioning devices Q skip the second and third slats P′ and P² in the manner previously described.

It will also be seen that the cleats 1, 2, 3 and 4 are in the nature of spacing members which, as shown, are in the form of bars extending transversely of the guides S, S′, and S² by which the binding members O, O′ and O² of the box or crate blank are held against lateral displacement during their endwise or longitudinal movement with the traveling work support. Means are provided, as previously stated, of any suitable character, depending upon the character of the binding members to be employed, for automatically feeding these longitudinal and parallel binding members upon the sections of sheet material which are properly spaced apart, and which form the body of each blank. It will also be seen that, in a machine constructed and operated in the manner shown and described, rear end portions of the materials are engaged by means carried by the work support, whereby these rear ends are held in alinement transversely of the direction of travel thereof. In this way the strips O, O′ and O² are always exactly opposite each other, and in exact alinement transversely of the direction of travel of the work support, thus insuring a properly shaped box or crate blank. No staples are driven between the blanks, as previously explained, and the mechanism for periodically rendering the feed pawls of the wire feeding devices inoperative is controlled by the traveling motion of the work-holder or work support, preferably by means carried thereon, such, for example, as the cam portions b′ previously described. It is obvious, however, that the wheel k, which is in the nature of a detector for finding the space between the blanks, through the medium, in this case, of an indicating cam for each space, may be operated by the motion of the work-holder in any suitable or desired manner. With the arrangement shown, the ends of the blanks overhang the side edges of the work-holder, and these overhanging portions are supported on stationary means, while the staples are being driven, whereby the driving of these staples does not subject the traveling work holder to additional strain. Thus, from the foregoing, it will be seen that means are not only provided for properly feeding longitudinally moving binding members upon the properly spaced sections of sheet material of each blank, in order to connect these sections together, but also for engaging the oncoming materials and subjecting them to a rearrangement or proper relative positioning operation while they are passing by—that is to say, while they are passing the operative position of the means for causing the said readjustment or relative positioning of the materials. In this way the blanks are of the proper length and width when finished, and are also of the proper shape in other respects; and in addition, the making of these blanks is accomplished without wasting any staple wire, inasmuch as no staples are driven between blanks, notwithstanding the fact that this is done without stopping the running of the staplers. In other words, the staplers are given a continuous operation, and reciprocate up and down without stopping; but at the same time the said staplers are rendered inoperative to drive staples at certain places on the traveling work holder, simply by the throwing out of the pawls of the ratchet devices, whereby the wires are not fed into position to be cut off and properly formed into staples. It will be understood that the said staplers can be of any suitable known or approved character, but are preferably of the well known kind in which each staple is made by automatically feeding a length of wire into position, then cutting off the proper length of said wire, and forming the same into a staple of the proper shape for insertion in the materials.

In the foregoing description, and in the following claims, I have for convenience and description and as a means of identification, referred to the slats O, O′ and O², as short slats or members or strips, and for the same purpose have referred to the slats P, P′ and P², as long slats or members or strips. It will be understood that I do not limit myself to any particular dimensions or proportions for the crate side.

What I claim as my invention is:—

1. In a machine of the class specified, an endless traveling work-holder having means for spacing apart the three long slats of a crate-side, means for holding the three cross slats in place on top of said long slats, and means for causing the work-holder to travel in a direction at right angles to the long slats and parallel with the cross slats.

2. The improved endless traveling work-holder having a plurality of formers each composed of link-connected sections and each provided with means for sustaining a plurality of lower and upper slats in properly spaced and crossed relation with the lower slats extending at right angles to and the upper slats parallel with the direction of travel.

3. In a machine of the class specified, a traveling work-holder provided with means for spacing apart the side and intermediate long slats of a crate-side, means for holding cross slats on top of said long slats, and provisions for automatically and intermittently advancing said work-holder in a direction at right angles to the long slats and parallel with the cross slats.

4. The improved endless traveling work-holder comprising parallel link-belts connected by parallel cross-bars to provide a flat bed or moving table for the crate-sides, the ends of said bars serving as connecting links in said link-belts.

5. In a machine of the class specified, the combination of a traveling work-holder, three hoppers for automatically feeding to the work-holder the three cross slats of a crate-side, means for spacing apart the long slats upon which the said cross slats are laid, and means for operating said work-holder.

6. In a machine of the class specified, the combination of a traveling work-holder, hoppers for the cross slats of a crate-side, means on the work-holder for spacing apart the long slats upon which the said cross slats are laid, means on the work-holder for engaging and removing the cross-slats from the hoppers, and means for intermittently advancing said work-holder to intermittently feed the slats from said hoppers.

7. The improved slat hoppers provided with vertical and rotatably and eccentrically mounted rods engaging the ends of the stacks of slats to hold the same in position to be discharged one slat at a time from the bottom of each hopper, substantially as set forth.

8. In a stapling machine, a wire feed consisting of the pawl $h$, link $h'$ supporting the pawl, operating link $h^2$ sustaining and actuating the pawl, a ratchet wheel engaged by said pawl, a wire-feeding roller operated by said ratchet wheel, skipping mechanism for throwing said pawl out of operation every fourth stroke thereof to prevent feeding of the wire, means for making and driving the staples, and means for presenting the work.

9. In a machine of the class specified, the combination of means for stapling the crate-sides, and a press for giving the crate-sides a final flattening before discharge from the machine.

10. The improved press comprising the jaw U, anvils $v$—$v'$—$v^2$ above the jaw, levers W for operating said jaw, and pitmen for actuating said levers, substantially as set forth.

11. The improved crate-side machine provided with a plurality of slat delivering gravity-feed hoppers spaced apart and positioned to feed downwardly a plurality of parallel strips crosswise of a plurality of parallel members, substantially as and for the purpose set forth.

12. A stapler provided with a wire-feeding mechanism comprising a ratchet wheel, a pawl for operating said ratchet wheel, and a pivoted link for supporting and limiting the stroke of the pawl, said link and pawl having a toggle, and means for actuating the same.

13. An assembler for assembling the members of a side or top of a package, comprising spaced hoppers in which the body members and battens of a side or top of a package are stacked, an endless carrier traveling beneath the said hoppers and having means for successively removing the members from the said hoppers and placing on a body member a set of spaced battens.

14. An assembler comprising stationary holders for holding body members and battens, and means for feeding the body members and battens from the bottoms of their holders with one superimposed upon the other.

15. An assembler comprising holders for holding the body members and battens at right angles to each other, means for feeding the body members and battens from their holders with the battens superimposed upon the body members, and means for securing the same together in flat form.

16. An assembler comprising holders for holding the body members and battens at right angles to each other, means for feeding a corresponding number of body members and battens from their holders with the battens superimposed upon the body members, and means for securing the same together in flat form.

17. An assembler comprising holders for holding the body members and battens at right angles to each other, and means for feeding the body members from their holders beneath the holders of the battens, and for feeding the battens from their holders superimposed upon the said body members, comprising a work-holder arranged to travel below said holders.

18. In a machine of the class described, the combination with a plurality of stationary reservoirs, of intermittently operable feeding mechanisms for removing strips of material from the bottoms of the reservoirs, and a securing mechanism to which said strips are presented in properly spaced and crossed relation.

19. An assembler for automatically assembling the members of a side or top of a package, comprising spaced hoppers, one for containing the body members of the package and the other for containing the battens, and traveling devices passing underneath the hoppers for removing successively the members from the hoppers for superimposing the battens on the body members.

20. In a machine of the class described, the combination with an intermittently operable feeding means, of a plurality of strip containing reservoirs, of which one is disposed at a right angle to the others, traveling devices for removing strips from the reservoirs, and maintaining the same in properly spaced relation, and an intermittently operable securing mechanism movable at the completion of each step of the feeding operation.

21. In a machine of the class described, the combination with step by step traveling feeding devices, of strip containing reservoirs from which strips are fed in crossed and spaced relation, a stapling mechanism, and means operable at the completion of each feeding movement to actuate said stapling mechanism for forcing securing staples through the strips.

22. In a machine of the class described, adapted for making crate sides, the combination of a work-supporting structure provided with means for holding a plurality of parallel slats with a plurality of parallel cross slats superimposed thereon, hoppers for containing and feeding the cross slats of each crate side, and means for producing relative traveling movement between the said work-supporting structure and the said hoppers, to produce the said automatic feeding of slats for each crate side, said work-supporting structure being provided with means for engaging the ends of the cross slats and causing a proper discharge thereof from said hoppers.

23. In a machine of the class specified, a traveling work-holder having a receiving end portion, staplers arranged over said work-holder, a plurality of hoppers disposed above and parallel with said work-holder, at a point between the said staplers and the said receiving end portion, feed mechanism for advancing said work-holder, said hoppers adapted to hold slats, said work-holder adapted to carry crosswise thereof the strips received at its receiving end portion, and said work-holder being provided with means for automatically transferring slats from said hoppers onto and crosswise of said strips.

24. In a machine for making crate sides or the like, the combination of means for moving forward a plurality of parallel members extending crosswise of the direction of movement, means including stationary hoppers arranged over the path of travel of said members, for automatically placing a plurality of cross strips on said members, and mechanism for securing the cross strips to the said members.

25. In a machine for making crate sides or the like, the combination of means for holding a plurality of parallel members, automatic mechanism including a plurality of hoppers for discharging downwardly a plurality of cross strips onto said members, and means for securing the cross strips to said members.

26. In a machine for making crate sides or the like, the combination of means including a plurality of gravity feed hoppers for automatically and simultaneously placing in position a plurality of parallel strips, and means for stapling said strips upon and crosswise of parallel members.

27. In a machine for making crate sides or the like, the combination of means including a plurality of gravity feed hoppers for automatically and simultaneously placing in position a plurality of parallel strips, means for effecting a forward movement of said strips in the direction of their length, and means for stapling said strips crosswise of other strips.

28. In a machine for making crate sides or the like, a plurality of parallel hoppers for holding slats, an endless traveling structure for carrying parallel members below said hoppers, means for moving said structure in a direction crosswise of said members and parallel with the strips in the hoppers, devices on said structure for automatically and simultaneously transferring a strip from each hopper on to a set of the said members, and means for stapling the strips to the members.

29. In a machine of the class specified, the combination of a traveling work-holder, a plurality of parallel hoppers disposed above and parallel with the direction of travel of said work-holder, a hopper disposed above and crosswise of the direction of travel of said work-holder, devices on said work-holder for removing body strips from the crosswise hopper and reinforcing strips from the parallel hoppers, and mechanisms for effecting the fastening together of said strips.

30. In a machine of the class specified, the combination of a traveling work-holder, a plurality of parallel hoppers disposed above and parallel with the direction of travel of said work-holder, devices on said work-holder for removing reinforcing strips from said hoppers, and mechanism for effecting a fastening of said strips to body members.

31. In a machine of the class specified, the combination of a traveling work-holder, a hopper disposed above and crosswise of said work-holder, devices on said work-holder for removing body members from said hopper, mechanism for effecting a fastening of reinforcing strips to the said body members, and means on said work-holder for engaging the ends of said strips to space the same apart endwise.

32. In a machine of the class specified, adapted for making box-blanks, the combination of a suitable work-holder, a plurality of parallel gravity feed hoppers disposed above the plane of the said work-holder, means for causing relative motion between said hoppers and the work-holder, in the direction of the length of said hoppers, a hopper disposed above the plane of the work-holder and crosswise of the direction of said relative movement, devices for removing body strips from the crosswise hopper and reinforcing strips from the parallel hoppers, during the said relative motion, and instrumentalities for effecting the fastening together of the thus automatically fed strips to form the blank.

33. In a machine of the class specified, adapted for making box-blanks, the combination of a suitable work-holder, a plurality of parallel gravity-feed hoppers disposed above the plane of said work-holder, means for causing relative motion between said hoppers and work-holder, in the direction of the length of said hoppers, devices for removing reinforcing strips from said hoppers, during the said relative motion, and instrumentalities for effecting the securing of the said strips to the blank.

34. In a machine of the class specified, adapted for making box-blanks, the combination of a suitable work-holder, a gravity-feed hopper disposed above and crosswise of the plane of said work-holder, means for causing relative motion between said hopper and work-holder, in a direction crosswise of said hopper, devices for removing body members from said hopper, during the said relative motion, instrumentalities for effecting a fastening of reinforcing strips to said body members, and means on said work-holder for spacing the said strips apart endwise.

35. In a machine of the class described, a supporting frame, a strip containing reservoir arranged transversely of the frame, a plurality of batten containing reservoirs arranged longitudinally of the frame, an endless feed chain, a feed block carried thereby and of a height approximately equal to the thickness of one of the strips and one of the battens, said block being arranged to first engage with a strip and then with a batten, and a cam arranged beyond the strip reservoir for engaging and depressing said strip in advance of the batten feeding movement.

36. In an apparatus of the class described, a frame, a strip containing reservoir disposed transversely thereof, a plurality of batten containing reservoirs arranged longitudinally of the frame, a plurality of endless feed belts, feed blocks secured thereto at intervals, and each of a height approximately equal to the thickness of a strip and a batten, and a cam arranged between the transverse reservoir and the longitudinal reservoirs for depressing the strip to permit the upper portion of the feed blocks to engage with and remove the battens from the reservoirs.

37. In a machine of the class specified, adapted for making box-blanks, the combination of a suitable work-holder, said work-holder being of such width that the ends of the box-blanks project beyond and overhang the sides thereof, as set forth, a plurality of parallel gravity-feed hoppers disposed above the plane of the said work-holder, means for causing relative motion between said hoppers and the work-holder, in the direction of the length of said hoppers, a hopper disposed above the plane of the work-holder and crosswise of the direction of said relative movement, devices for removing body strips from the crosswise hopper and reinforcing strips from the parallel hoppers, during the said relative motion, and instrumentalities for effecting the fastening together of the thus automatically fed strips to form the blank.

38. In a machine of the class specified, adapted for making box-blanks, the combination of a suitable work-holder, said work-holder being of such width that the ends of the box-blanks project beyond and overhang the sides thereof, as set forth, a plurality of parallel gravity-feed hoppers disposed above the plane of said work-holder, means for causing relative motion between said hoppers and work-holder, in the direction of the length of said hoppers, devices for removing reinforcing strips from said hoppers, during the said relative motion, and instrumentalities for effecting the securing of the said strips to the blank.

39. In a machine of the class specified, adapted for making box-blanks, the combination of a suitable work-holder, said work-holder being of such width that the ends of the box blanks project beyond and overhang the sides thereof, as set forth, a gravity-feed hopper disposed above and crosswise of the plane of said work-holder, means for causing relative motion between said hopper and work-holder, in a direction crosswise of said hopper, devices for removing body members from said hopper, during the said relative motion, instrumentalities for effecting a fastening of reinforcing strips to said body members, and means on said work-holder for spacing the said strips apart endwise.

40. In a box blank machine, means for supporting sheet material, means for properly positioning end and intermediate cross strips or battens on top of said sheet material, means for automatically feeding the said sheet material and battens in assembled relation, staplers for securing the end battens to the sheet material, and stapling mechanism for securing the intermediate strip material or battening in place upon the top of said sheet material, crosswise thereof, to form a rectangular blank.

41. In a crate side machine, a work-holder for retaining transverse strips in place with parallel reinforcing members on top thereof, a hopper for holding said strips, means for causing relative movement between said hopper and work-holder, in a direction longitudinal of said reinforcing members, to automatically feed the said body strips into position on the work-holder, and means for driving fastening devices to secure the said members and strips together, with the former crosswise of the latter.

42. In a crate side machine, a traveling work-holder for supporting reinforcing members and body strips in position, which body strips are of uniform length, means for operating said work-holder to carry the said members and strips forward in a horizontal plane, a hopper for holding and automatically feeding the body strips, by the forward movement of the work-holder, and means for securing the members and strips together, with said members uppermost.

43. In a crate side machine, means for supporting reinforcing members and body strips, which body strips are of uniform length, means for propelling the said parts along in flat or blank form in a straight path lengthwise of said reinforcing members, a hopper holding and feeding the body strips, by the action of the propelling means, and means for stapling the members and strips together, with the said members uppermost.

44. In a crate side machine, a work table upon which parallel rows of reinforcing members are supported end to end for movement in the parallel direction thereof, with body strips of uniform length crosswise of said parallel rows, means for propelling said assembled parts in the direction of said rows of reinforcing members, a hopper for holding and automatically feeding the said body strips, by the motion of said work-table, and means for stapling the said members and strips together, said hopper extending crosswise of said parallel rows.

45. In a crate side machine, means for supporting reinforcing members and body strips, which body strips are of uniform length, means for propelling the said parts along in flat or blank form in a straight path lengthwise of said reinforcing members, having provisions for engaging the ends of said reinforcing members, a hopper for holding and feeding the body strips, by the action of the propelling means, and means for stapling the members and strips together, with said members uppermost.

46. In a crate side machine, a work table upon which straight parallel rows of reinforcing members are supported end to end for movement in the parallel direction thereof, with body strips of uniform length crosswise of said parallel rows, means for propelling said assembled parts along in flat or blank form in the direction of said rows of reinforcing members, having provisions for engaging the ends of the latter, a hopper for holding and automatically feeding the said body strips, by the action of the propelling means, and means for stapling the said members and strips together, with said members uppermost.

47. In a crate side machine, a work-holder for retaining parallel reinforcing members in place, a hopper for holding body strips, and means for causing relative movement between said hopper and work-holder, in a direction longitudinal of said reinforcing members, to automatically feed the said body strips into position on the work-holder, and means for driving fastening devices to secure the said reinforcing members and body strips together, with the former crosswise of the latter, and means on said work-holder for engaging the ends of said members to space them apart endwise.

48. In a crate side machine, a traveling work-holder for supporting reinforcing members and body strips in position, which body strips are of uniform length, a hopper for holding and feeding the body strips, by the action of the work-holder, means for securing the members and strips together, said work-holder having means for engaging said reinforcing members to space and hold the same in position, and means for preventing displacement of said strips laterally of the path of travel thereof.

49. In a crate side machine, means for supporting reinforcing members and body strips, which body strips are of uniform length, means for propelling the said parts along in a direction lengthwise of said reinforcing members, having provisions for engagement with the latter, a hopper for holding and feeding the body strips crosswise of said direction, by the action of said propelling means, means for stapling the members and strips together, and means for preventing displacement of said strips laterally of the path of travel thereof.

50. A crate or box blank machine comprising a traveling mechanism for supporting and moving the blank materials in properly spaced and crossed relation, in a horizontal plane, and with longitudinal reinforcing members on top thereof, means for stapling the materials together, by inserting the staples in straight rows through an upper layer of thin material and into a body of suitable material below, means for supporting said mechanism for movement in a straight line, and a hopper for holding some of said materials subject to the action of said mechanism, whereby the operation of said mechanism automatically feeds the contents of said hopper into place on said mechanism.

51. A crate or box blank machine comprising a mechanism for holding and moving the blank materials in properly crossed relation, by motion along a straight line in a horizontal plane, and with longitudinal reinforcing members on top thereof, means for stapling the materials together, by inserting the staples in straight rows through an upper layer of thin material and into a body of suitable material below, and a hopper holding some of said materials subject to the action of said mechanism, whereby the operation of said mechanism automatically feeds the contents of said hopper to said mechanism.

52. An assembler comprising holders for holding the body members and battens at right angles to each other, means for feeding the body members and battens from their holders, with the battens superimposed upon the body members, means for securing the same together in flat form, and mechanism for accelerating the forward movement of some parts of the work immediately before the same is fastened together.

53. In a machine of the class specified, a traveling work-holder having a receiving end portion, staplers arranged over said work-holder, a plurality of hoppers disposed above and parallel with said work-holder, at a point between the said staplers and the said receiving end portion, feed mechanism for advancing said work-holder, said hopper adapted to hold slats, said work-holder adapted to carry crosswise thereof the strips received at its receiving end portion, said work-holder being provided with means for automatically transferring slats from said hoppers onto and crosswise of said strips, and mechanism for accelerating the forward movement of some parts of the work immediately before the same is fastened together.

54. In a machine for making crate sides or the like, the combination of means for holding a plurality of parallel members, automatic mechanism including a plurality of hoppers for discharging downwardly a plurality of cross strips onto said members, means for securing the cross strips to said members, and mechanism for accelerating the forward movement of some parts of the work immediately before the same is fastened together.

55. In a machine for making crate sides or the like, the combination of means including a plurality of gravity feed hoppers for automatically and simultaneously placing in position a plurality of parallel strips, means for effecting a forward movement of said strips in the direction of their length, means for stapling said strips crosswise of other strips, and mechanism for accelerating the forward movement of some parts of the work immediately before the same is fastened together.

56. A crate or box blank machine comprising a traveling mechanism for supporting and moving the blank materials in properly spaced and crossed relation, in a horizontal plane, means for stapling the materials together, by inserting the staples in straight rows through an upper layer of thin material and into a body of suitable material below, means for supporting said mechanism for movement in a straight line, a hopper for holding some of said materials subject to the action of said mechanism, whereby the operation of said mechanism automatically feeds the contents of said hopper into place on said mechanism, and mechanism for accelerating the forward movement of some parts of the work immediately before the same is fastened together.

57. A crate or box blank machine comprising a mechanism for holding and moving the blank materials in properly crossed relation, by motion along a straight line in a horizontal plane, means for stapling the materials together, by inserting the staples in straight rows through an upper layer of thin material and into a body of suitable material below, a hopper holding some of said materials subject to the action of said mechanism, whereby the operation of said mechanism automatically feeds the contents of said hopper to said mechanism, and mechanism for accelerating the forward movement of some parts of the work immediately before the same is fastened together.

58. An assembler comprising holders for holding the body members and battens at right angles to each other, means for feeding the body members and battens from their holders with the battens superimposed upon the body members, means for securing the same together in flat form, and spring-controlled guide fingers for engaging the edges of certain parts of the work to keep the same in position.

59. In a machine of the class specified, a traveling work-holder having a receiving end portion, staplers arranged over said work-holder, a plurality of hoppers disposed above and parallel with said work-holder, at a point between the said staplers and the said receiving end portion, feed mechanism for advancing said work-holder, said hoppers adapted to hold slats, said work-holder adapted to carry crosswise thereof the strips received at its receiving end portion, said work-holder being provided with means for automatically transferring slats from said hoppers onto and crosswise of said strips, and spring-controlled guide fingers for engaging the edges of certain parts of the work to keep the same in position.

60. In a machine for making crate sides or the like, the combination of means for holding a plurality of parallel members, automatic mechanism including a plurality of hoppers for discharging downwardly a plurality of cross strips onto said members, means for securing the cross strips to said members, and spring controlled guide fingers for engaging the edges of certain parts of the work to keep the same in position.

61. In a machine for making crate sides or the like, the combination of means including a plurality of gravity feed hoppers for automatically and simultaneously placing in position a plurality of parallel strips, means for effecting a forward movement of said strips in the direction of their length, means for stapling said strips crosswise of other strips, and spring-controlled guide fingers for engaging the edges of certain parts of the work to keep the same in position.

62. A crate or box blank machine comprising a traveling mechanism for supporting and moving the blank materials in properly spaced and crossed relation, in a horizontal plane, means for stapling the materials together, by inserting the staples in straight rows through an upper layer of thin material and into a body of suitable material below, means for supporting said mechanism for movement in a straight line, a hopper for holding some of said materials subject to the action of said mechanism, whereby the operation of said mechanism automatically feeds the contents of said hopper into place on said mechanism, and spring controlled guide fingers for engaging the edges of certain parts of the work to keep the same in position, laterally of the path of travel thereof.

63. A crate or box blank machine comprising a mechanism for holding and moving the blank materials in properly crossed relation, by motion along a straight line in a horizontal plane, means for stapling the materials together, by inserting the staples in straight rows through an upper layer of thin material and into a body of suitable material below, a hopper holding some of said materials subject to the action of said mechanism, whereby the operation of said mechanism automatically feeds the contents of said hopper to said mechanism, and spring-controlled guide fingers for engaging the edges of certain parts of the work to keep the same in position, laterally of the path of travel thereof.

64. In a box or crate blank machine, the combination of means for causing body strips and reinforcing members to move along in a direction crosswise of the body strips, staples for securing the said strips and members together, and mechanism for additionally moving the strips forward before they pass under the staplers.

65. A box or crate blank machine comprising staplers, means for driving the materials forward to the staplers, and mechanism for engaging and automatically changing the relative positions of the materials, while they are moving along and before they are stapled together.

66. A box or crate blank machine comprising staplers, means for feeding the assembled materials under the staplers, and mechanism for re-adjusting some of the materials before they are stapled together, disposed in position to regulate the same while they are moving along.

67. A box or crate blank machine comprising staplers, means for causing the materials to move forward to the staplers, and mechanism for automatically producing a correct spacing of the materials before they are stapled together, disposed in such position that the blanks are successively engaged thereby.

68. A box or crate blank machine comprising staplers, means for driving the materials forward to the staplers, and mechanism for automatically changing the relative positions of the materials before they are stapled together, said mechanism having an entering portion which engages the blank between edges of the veneer of each blank and moves a distance therewith, and means for moving said portion into and out of the path of the materials.

69. A box or crate blank machine comprising staplers, means for feeding the assembled materials under the staplers, and mechanism for re-adjusting some of the materials before they are stapled together, said mechanism having a portion which engages the blanks between edges of the veneer of each blank and moves a distance therewith.

70. A box or crate blank machine comprising staplers, means for causing the materials to move forward to the staplers, and mechanism for automatically producing a correct spacing of the materials before they are stapled together, said mechanism having a portion which engages between edges of the veneer of each blank and moves a distance therewith, the said portion being separate and distinct from said means.

71. A box or crate blank machine comprising staplers, means for driving the materials forward to the staplers, and mechanism for automatically changing the relative position of the materials before they are stapled together, disposed in position to perform successive operations on the materials, said mechanism including a finger that engages the materials of each blank and moves a distance therewith.

72. A box or crate blank machine comprising staplers, means for feeding the assembled materials under the staplers, and mechanism for re-adjusting some of the materials before they are stapled together, said mechanism including a finger that engages the materials of each blank and moves a distance therewith.

73. A box or crate blank machine comprising staplers, means for causing the materials to move forward to the staplers, and mechanism for automatically spacing the materials before they are stapled together, by successive operations thereon, said mechanism including a finger that successively engages the materials of each and every blank and moves a distance therewith.

74. A machine for making box or crate blanks, comprising a traveling work-holder having means for holding a plurality of long members in parallel and spaced relation, means for positioning a plurality of short members on top of said long members, crosswise thereof, to form a crate side with openings therein, means for automatically operating said work-holder, thereby causing all of said members to move forward together, and means for stapling the short members upon the long members, by a plurality of successive operations on each blank.

75. A machine for making box or crate blanks, comprising a traveling work-holder having means for holding a plurality of long members in parallel and spaced relation, means for positioning a plurality of short members on top of said long members, crosswise thereof, to form a crate side with openings therein, means for automatically operating said work-holder, thereby causing all of said members to move forward together, and means for stapling the short members upon the long members, by a plurality of successive operations on each blank, said work-holder traveling in the direction of said short members.

76. A machine for making box and crate blanks, comprising a traveling work-holder having means for positioning a plurality of short members, means for holding a plurality of long members in parallel and spaced relation crosswise of said short members, to form a crate side with openings therein, means for automatically operating said short work-holder, means whereby said members are held against displacement, and means for stapling the long and short members together, by successive operations on each blank, said operations alternating with the actuations of the work holder.

77. A machine for making box and crate blanks, comprising a traveling work-holder having means for positioning a plurality of short members, means for holding a plurality of long members in parallel and spaced relation crosswise of said short members, to form a crate side with openings therein, means for automatically operating said work-holder, means whereby said members are held against displacement, and means for stapling the long and short members together, by successive operations on each blank, said work-holder traveling in the direction of said short members.

78. A machine for making box or crate blanks, comprising stapling and work feeding instrumentalities coöperating to fasten the blank materials together by a plurality of successive stapling operations on each blank, and mechanism disposed in position to engage the oncoming materials, for automatically determining the proper relation of the materials to each other before the same are fastened together.

79. A machine for making box or crate blanks, comprising stapling and work feeding instrumentalities coöperating to fasten the blank materials together by a plurality of successive stapling operations on each blank, and mechanism disposed in position to engage the oncoming materials, for automatically determining the relation of the materials before the same are fastened together, including a positioning device movable into and out of the path of said materials to establish correct spaces in said blanks.

80. A machine for making box or crate blanks, comprising stapling and work feeding instrumentalities coöperating to fasten the blank materials together by a plurality of successive stapling operations on each blank, and mechanism disposed in position to engage the oncoming materials, for automatically determining the relation of the materials before the same are fastened together, said instrumentalities coöperating to fasten sheets of veneer to short strips, and having provisions for causing the materials to have a step by step motion in a direction parallel with said strips.

81. A machine for making box or crate blanks, comprising stapling and work feeding instrumentalities coöperating to fasten the blank materials together by a plurality of successive stapling operations on each blank, and mechanism disposed in position to engage the oncoming materials, for automatically determining the relation of the materials before the same are fastened together, including a pair of positioning devices movable into and out of the path of said materials to establish correct spaces in said blanks, said instrumentalities coöperating to fasten sheets of veneer to short strips, and having provisions for causing the materials to have a step by step motion in a direction parallel with said strips.

82. A machine for making box or crate blanks, comprising stapling and work feeding instrumentalities coöperating to fasten the blank materials together by a plurality of successive stapling operations on each blank, and mechanism disposed in position to engage the oncoming materials, for automatically determining the relation of the materials before the same are fastened together, said mechanism operating to produce relative movement of said materials.

83. A machine for making box or crate blanks, comprising stapling and work feeding instrumentalities coöperating to fasten the blank materials together by a plurality of successive stapling operations on each blank, and mechanism disposed in position to engage the oncoming materials, for automatically determining the relation of the materials before the same are fastened together, including a positioning device movable into and out of the path of said materials to establish correct spaces in said blanks, said mechanism operating to produce relative movement of said materials.

84. A machine for making box or crate blanks, comprising automatic stapling and work feeding devices coöperating to fasten the blank materials together, and mechanism for automatically preventing the driving of staples between blanks, including a wire feed pawl, and means for automatically throwing said pawl out of action when a space between blanks passes under the stapling device.

85. A machine for making box or crate blanks, comprising automatic stapling and work feeding devices coöperating to fasten the blank materials together, and mechanism for automatically preventing the driving of staples between blanks, controlled by the forward feeding motion of the devices which produce the feeding motion of said materials.

86. A machine for making box or crate blanks, comprising wire feeding and stapling and work feeding devices coöperating to fasten the blank materials together, and mechanism for automatically preventing the driving of staples between blanks, having provisions for interrupting the wire feeding device, to prevent the formation of staples without stopping the running of the stapling device.

87. A machine for making box or crate blanks, comprising automatic stapling and work feeding devices coöperating to fasten the blank materials together, and mechanism for automatically preventing the driving of staples between blanks, together with means for relatively positioning the parts of each blank before being stapled together, disposed in position to engage the oncoming materials of each blank.

88. A machine for making box or crate blanks, comprising automatic stapling and work feeding devices coöperating to fasten the blank materials together, and mechanism for automatically preventing the driving of staples between blanks, together with means movable into and out of the path of the materials, and traveling a slight distance therewith for producing correct spacing in each blank.

89. A box blank machine comprising staplers, means for feeding the blank materials to the staplers, and automatically governed mechanism for controlling said staplers without interrupting the running thereof to prevent the driving of staples between the blanks.

90. A box blank machine comprising staplers, parallel guides, means for feeding the materials along said guides, said means and guides coöperating to present the materials to said staplers in superimposed and crossed relation, means for actuating said staplers to secure the materials together by a plurality of successive operations for each blank, said feeding means having provisions whereby the blank is formed with spaces at intervals in the direction of travel thereof, and for positioning the upper materials on those below.

91. A box blank machine comprising staplers, parallel guides, means for feeding the materials along said guides, said means and guides coöperating to present the materials to said staplers in superimposed and crossed relation, means for actuating said staplers to secure the materials together by a plurality of successive operations for each blank, said feeding means having provisions whereby the blank is formed with spaces at intervals in the direction of travel thereof, and for positioning the upper materials on those below, said provisions including spacers extending transversely of said guides, and said feeding means including link belts to which said spacers are attached.

92. A box blank machine comprising staplers, parallel guides, means for feeding the materials along said guides, said means and guides coöperating to present the materials to said staplers in superimposed and crossed relation, means for actuating said staplers to secure the materials together by a plurality of successive operations for each blank, said feeding means having provisions whereby the blank is formed with spaces at intervals in the direction of travel thereof, and for positioning the upper materials on those below, said machine having a pivoted member for each guide, and springs for yieldingly holding said members in the path of the endwise traveling materials.

93. A box blank machine comprising staplers, parallel guides, means for feeding the materials along said guides, said means and guides coöperating to present the materials to said staplers in superimposed and crossed relation, means for actuating said staplers to secure the materials together by a plurality of successive operations for each blank, said feeding means having provisions whereby the blank is formed with spaces at intervals in the direction of travel thereof, and for positioning the upper materials on those below, said machine having automatic mechanism for preventing the driving of staples between blanks, and means for automatically controlling said mechanism by the motion of said feeding means.

94. A machine for making box blanks by securing the sheet material to parallel strips, comprising guides for said strips, means for securing the sheet material to the strips by a plurality of successive fastening operations for each blank, instrumentalities for causing the sheet material and strips to have a step by step feeding motion relative to said means, coöperating with said guides to cause the strips to travel endwise one behind the other in parallel rows, devices for relatively positioning the sheet material and strips before the fastening together thereof, structural elements for supporting said devices in position to operate adjacent the path of travel of said material and strips, and mechanism for intermittently actuating said means.

95. A machine for making box blanks by securing the sheet material to parallel strips, comprising guides for said strips, means for securing the sheet material to the strips by a plurality of successive fastening operations for each blank, instrumentalities for causing the sheet material and strips to have a step by step feeding motion relative to said means, coöperating with said guides to cause the strips to travel endwise one behind the other in parallel rows, devices for relatively positioning the sheet material and strips before the fastening together thereof, structural elements for supporting said devices in position to operate adjacent the path of travel of said sheet material and strips, and mechanism for intermittently actuating said means, said devices including means for engaging the strips to correctly position them relative to each other, and also including means for engaging edges of the sheet material and movable a distance therewith in the direction of travel thereof.

96. A machine for making box blanks by securing the sheet material to parallel strips, comprising guides for said strips, means for securing the sheet material to the strips by a plurality of successive fastening operations for each blank, instrumentalities for causing the sheet material and strips to have a step by step feeding motion relative to said means, coöperating with said guides to cause the strips to travel endwise one behind the other in parallel rows, devices for relatively positioning the sheet material and strips before the fastening together thereof, structural elements for supporting said devices in position to operate adjacent the path of travel of said material and strips, and mechanism for intermittently actuating said means, said devices including a strip engaging member for each guide, having an axis of movement relative thereto, and also including means insertible into the path of the sheet material, movable a distance in the direction of travel thereof and then returnable to position for another operation.

97. A machine for making box blanks by securing the sheet material to parallel strips, comprising guides for said strips, means for securing the sheet material to the strips by a plurality of successive fastening operations for each blank, instrumentalities for causing the sheet material and strips to have a step by step feeding motion relative to said means, coöperating with said guides to cause the strips to travel endwise one behind the other in parallel rows, devices for relatively positioning the sheet material and strips before the fastening together thereof, structural elements for supporting said devices in position to operate adjacent the path of travel of said material and strips, and mechanism for intermittently actuating said means, said devices including means for engaging edges of the sheet material, to relatively position said edges, movable into and out of the plane of said material, and being also supported to move a distance with the sheets before disengaging therefrom.

98. A box blank machine comprising an endless traveling structure for feeding the blank materials forward, means mounted on said structure for spacing the successive sections of sheet material of each blank, serving also to push the sheet material forward with said structure, by engagement with the rear edge of each section, means for supplying parallel binding members upon said sheet material, longitudinally of said structure, fastener driving mechanism for securing said members to the sheet material, by successive operations on each blank, thereby successively connecting together the sections of the blank, means disposed on said traveling structure for pushing forward on the rear ends of portions of said blank materials, said ends and edges being disposed in different parallel planes, and means for causing said structure to have a step by step feeding motion.

99. A box blank machine comprising an endless traveling structure for feeding the blank materials forward, means mounted on said structure for spacing the successive sections of sheet material of each blank, serving also to push the sheet material forward with said structure, by engagement with the rear edge of each section, means for supplying parallel binding members upon said sheet material, longitudinally of said structure, fastener driving mechanism for securing said members to the sheet material, by successive operations on each blank, thereby successively connecting together the sections of the blank, means disposed on said traveling structure for pushing forward on the rear ends of portions of said blank materials, said ends and edges being disposed in different parallel planes, and means for causing said structure to have a step by step feeding motion, the said machine being arranged to have both inside and outside lateral engagement with the materials to prevent displacement of said portions from the path of travel thereof.

100. A box blank machine comprising an endless traveling structure for feeding the blank materials forward, means mounted on said structure for spacing the successive sections of sheet material of each blank, serving also to push the sheet material forward with said structure, by engagement with the rear edge of each section, means for supplying parallel binding members upon said sheet material, longitudinally of said structure, fastener driving mechanism for securing said members to the sheet material, by successive operations on each blank, thereby successively connecting together the sections of the blank, means disposed on said traveling structure for pushing forward on the rear ends of portions of said blank materials, said ends and edges being disposed in different parallel planes, and means for causing said structure to have a step by step feeding motion, the said machine having automatic means for preventing the driving of fasteners between the blanks.

101. A box blank machine comprising an endless traveling structure for feeding the blank materials forward, means mounted on said structure for spacing the successive sections of sheet material of each blank, serving also to push the sheet material forward with said structure, by engagement with the rear edge of each section, means for supplying parallel binding members upon said sheet material, longitudinally of said structure, fastener driving mechanism for securing said members to the sheet material, by successive operations on each blank, thereby successively connecting together the sections of the blank, means disposed on said traveling structure for pushing forward on the rear ends of portions of said blank materials, said ends and edges being disposed in different parallel planes, and means for causing said structure to have a step by step feeding motion, the said machine having means for preventing the driving of fasteners between the blanks, controlled automatically by the motion of said work support.

102. A box blank machine comprising an endless traveling structure for feeding the blank materials forward, means mounted on said structure for spacing the successive sections of sheet material of each blank, serving also to push the sheet material forward with said structure, by engagement with the rear edge of each section, means for supplying parallel binding members upon said sheet material, longitudinally of said structure, fastener driving mechanism for securing said members to the sheet material, by successive operations on each blank, thereby successively connecting together the sections of the blank, means disposed on said traveling structure for pushing forward on the rear ends of portions of said blank materials, said ends and edges being disposed in different parallel planes, and means for causing said structure to have a step by step feeding motion, the said mechanism having a device for feeding the wire for the fasteners, means for preventing the driving of fasteners between the blanks, by rendering said device inoperative without interrupting the actuation of said mechanism, and a controller for said last mentioned means, operated by said structure.

103. A box blank machine comprising an endless traveling structure for feeding the blank materials forward, means mounted on said structure for spacing the successive sections of sheet material of each blank, serving also to push the sheet material forward with said structure, by engagement with the rear edge of each section, means for supplying parallel binding members upon said sheet material, longitudinally of said structure, fastener driving mechanism for securing said members to the sheet material, by successive operations on each blank, thereby successively connecting together the sections of the blank, means disposed on said traveling structure for pushing forward on the rear ends of portions of said blank materials, said ends and edges being disposed in different parallel planes, and means for causing said structure to have a step by step feeding motion, the said machine having means for automatically supplying the sheet material to said work support.

104. A box blank machine comprising an endless traveling structure for feeding the blank materials forward, means mounted on said structure for spacing the successive sections of sheet material of each blank, serving also to push the sheet material forward with said structure, by engagement with the rear edge of each section, means for supplying parallel binding members upon said sheet material, longitudinally of said structure, fastener driving mechanism for securing said members to the sheet material, by successive operations on each blank, thereby successively connecting together the sections of the blank, means disposed on said traveling structure for pushing forward on the rear ends of portions of said blank materials, said ends and edges being disposed in different parallel planes, and means for causing said structure to have a step by step feeding motion, the said machine having automatic means for relatively positioning the materials before they are fastened together.

105. A box blank machine comprising an endless traveling structure for feeding the blank materials forward, means mounted on said structure for spacing the successive sections of sheet material of each blank, serving also to push the sheet material forward with said structure, by engagement with the rear edge of each section, means for supplying parallel binding members upon said sheet material, longitudinally of said structure, fastener driving mechanism for securing said members to the sheet material, by successive operations on each blank, thereby successively connecting together the sections of the blank, means disposed on said traveling structure for pushing forward on the rear ends of portions of said blank materials, said ends and edges being disposed in different parallel planes, and means for causing said structure to have a step by step feeding motion, the said machine having automatic means for adjusting and correcting the relative positions of some of said materials before they are fastened together.

106. A machine for making box or crate blanks, comprising a traveling work-holder having means for holding a plurality of long members in parallel and spaced relation, means for positioning a plurality of short members on top of said long members, crosswise thereof, to form a crate side with openings therein, means for automatically operating said work-holder, means for stapling the short members upon the long members, by a plurality of successive operations on each blank, guides for holding the endwise moving members against lateral displacement, and stationary means across which the blanks are carried by said work-holder and upon which the end portions of each blank are supported while being stapled.

107. A machine for making box or crate blanks, comprising a traveling work-holder having means for holding a plurality of long members in parallel and spaced relation, means for positioning a plurality of short members on top of said long members, crosswise thereof, to form a crate side with openings therein, means for automatically operating said work-holder, means for stapling the short members upon the long members, by a plurality of successive operations on each blank, said work-holder traveling in the direction of said short members, guides for holding the endwise moving members against lateral displacement, and stationary means across which the blanks are carried by said work holder and upon which the end portions of each blank are supported while being stapled.

108. A machine for making box and crate blanks, comprising a traveling work-holder having means for positioning a plurality of short members, means for holding a plurality of long members in parallel and spaced relation crosswise of said short members, to form a crate side with openings therein, means for automatically operating said work-holder, means for stapling the long and short members together, by successive operations on each blank, guides for holding the endwise moving members against lateral displacement, and stationary means across which the blanks are carried by said work holder and upon which the end portions of each blank are supported while being stapled.

109. A machine for making box crate blanks, comprising a traveling work-holder having means for positioning a plurality of short members, means for holding a plurality of long members in parallel and spaced relation crosswise of said short members, to form a crate side with openings therein, means for automatically operating said work-holder, means for stapling the long and short members together, by successive operations on each blank, said work-holder traveling in the direction of said short members, guides for holding the endwise moving members against lateral displacement, and stationary means across which the blanks are carried by said work-holder and upon which the end portions of each blank are supported while being stapled.

110. A machine for making box or crate blanks, comprising a traveling work-holder having means for holding a plurality of sheet members in parallel and spaced relation, means for positioning a plurality of flat members on top of said sheet members, crosswise thereof, to form a crate side with openings therein, means for automatically operating said work-holder a plurality of times for each blank, thereby causing all of said members to move forward together, and means for stapling the flat members upon the sheet members by a plurality of successive operations on each blank.

111. A machine for making box and crate blanks, comprising a traveling work-holder having means for positioning a plurality of flat members, means for holding a plurality of sheet members in parallel and spaced relation crosswise of said flat members, to form a crate side with openings therein, means for automatically operating said work-holder a plurality of times for each blank, means whereby said members are held against displacement, and means for stapling the sheet and flat members together by successive operations on each blank, said operations alternating with the actuations of the work-holder.

112. A machine for making box or crate blanks, comprising a traveling work-holder having means to support the blanks, devices on said work-holder to position sheet material in a plurality of superimposed layers thereon, mechanism for operating said work-holder a plurality of times for each blank, staplers disposed in position to operate on said blanks, and means for operating said staplers a plurality of times for each blank to drive the staples in straight rows extending in the direction of travel of said blanks, said devices being arranged to position a plurality of flat strips in parallel and spaced relation for one said layer.

113. A machine for making box or crate blanks, comprising a traveling work-holder having means to support the blanks, devices on said work-holder to position sheet material in a plurality of superimposed layers thereon, mechanism for operating said work-holder a plurality of times for each blank, staplers disposed in position to operate on said blanks, and means for operating said staplers a plurality of times for each blank to drive the staples in straight rows extending in the direction of travel of said blanks, said devices being arranged to position a plurality of flat strips in parallel and spaced relation for one said layer, and said work-holder and devices being constructed to receive and support said strips upon the other layer.

114. A machine for making box or crate blanks, comprising a traveling work-holder having means to support the blanks, devices on said work-holder to position sheet material in a plurality of superimposed layers thereon, mechanism for operating said work-holder a plurality of times for each blank, staplers disposed in position to operate on said blanks, and means for operating said staplers a plurality of times for each blank to drive the staples in straight rows extending in the direction of travel of said blanks, said devices being arranged to position a plurality of flat strips in parallel and spaced relation for one said layer, and said work-holder being supported for feeding movement longitudinally of said strips.

Signed by me at Chicago, Ill., this 6th day of February, 1906.

EDWARD CRAIG.

Witnesses:
A. F. DURAND,
F. H. DRURY.